J. O. Woods, Ripping Tool.

117588  PATENTED AUG 1 1871

Witnesses:
M. Vorlaender
Wm. H. C. Smith.

Inventor:
J. O. Woods.
PER
Attorneys.

UNITED STATES PATENT OFFICE.

JUSTUS O. WOODS, OF NEW YORK, N. Y.

IMPROVEMENT IN RIPPING-TOOLS.

Specification forming part of Letters Patent No. 117,588, dated August 1, 1871.

*To all whom it may concern:*

Be it known that I, JUSTUS O. WOODS, of the city of New York, in the county and State of New York, have invented a new and Improved Ripping-Tool; and I do hereby declare that the following is a full, clear, and exact description thereof, which will enable others skilled in the art to make and use the same, reference being had to the accompanying drawing forming part of this specification.

My invention relates to a new and useful tool for ripping seams sewed in cloth and for other purposes. It consists in a small flat instrument, of steel or other suitable material, with a wide notch in one end, in which an oblique knife-edged cutter and a clearance for the shreds are formed on the bottom of said notch, while the prongs or projections at the sides of the notch form guides for keeping the seam to be ripped on the said knife-edge, each guide being different from the other, and adapted for a seam differing in some respects from what the other is adapted to. The handle or stock of the instrument is provided with a notch adapted for use as a wrench; also a hook and a niche, whereby the said implement is adapted for several uses in connection with sewing-machines; the object of the invention being to provide a simple and efficient implement which will act by a shear cut instead of the direct jam cut common to other ripping-tools, in which the cutting-edge is presented perpendicular, or nearly so, to the seam; also to adjust the seam or cause it to assume the proper relation with the cutter as it is brought to the cutting-edge.

Figure 1:
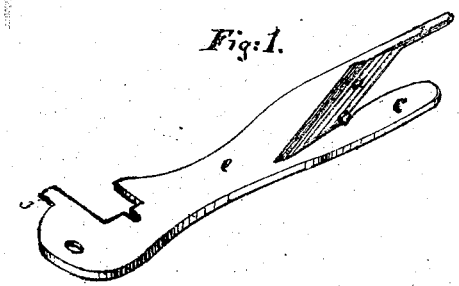
Figure 2:
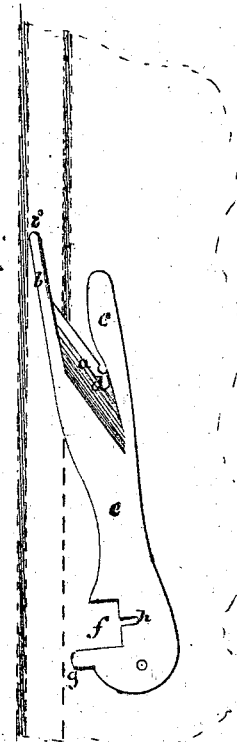
Figure 3:
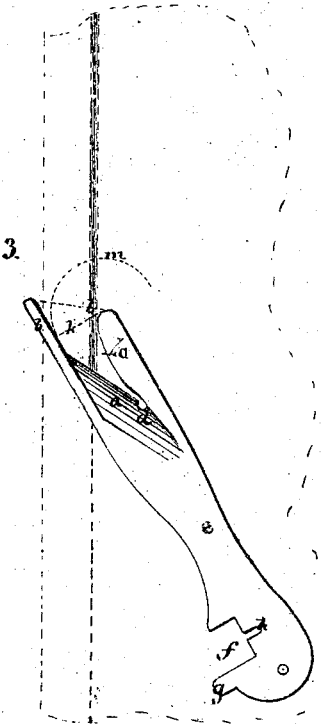

Figure 1 is a perspective view of my improved implement. Fig 2 represents a mode of using it for ripping seams, adapted for the use of one of the prongs as a guide; and Fig. 3 represents the application of the said implement to seams adapted for the use of the other prong as a guide.

$a$ represents the knife-edged blade; $b$, one of the prongs constituting a guide, being oval or nearly round in cross-section, longer than the other prong, and forming a projection beyond the point of the blade in a right line before it. $c$ is the other prong, being a guard projecting from the heel of the blade in front of the cutting-edge, and being wider and flatter than $b$. $d$ is an eye or enlargement of the space at the junction of the knife-blade with the part $c$. $e$ is the stock or body of the plate of which the implement is made. $f$ is the notch adapting the stock to be used as a wrench; $g$, the hook; and $h$ the niche.

The cutter is set obliquely to the line in which it is to be moved, and so beveled that, in passing between the parallel surfaces of cloth, it will touch neither of them. The guide $b$ extends in a right line before the cutter to enter between the two pieces of cloth to be ripped apart, and thus straighten the seam. Its extension beyond the guard $c$ has the effect of greatly widening the space or opening between them for admitting the seam to the cutter without increasing the width of the instrument, as indicated by the lines $k$, $l$, and $m$, and thus facilitates placing the cutter upon the seam. If the guide $b$ were the same length of $c$ the opening would only be as wide as the length of line $k$, whereas, being prolonged, the said opening is practically as wide as the length of the line $l$, which greatly facilitates the entering of the end of the seam between the prongs, which may be readily done by using the guide $b$ as a feeler thrust between the folds of the cloth. Its other office is to guide the instrument and keep the line of seam upon the cutter at the right point by pressing against the back of the fold, as indicated at $i$, and thus keep it from falling into the eye $d$ and jamming and clogging. If the fold be too wide, or have no back for said guide $b$ to act upon, the guard $c$ is brought against the seam, and, as a guide, acts, as guide $b$ does, in keeping the seam upon the blade, as indicated in Fig. 3, so that in either case it cannot fall into the eye. The eye is not a cutting-point, but is merely a beveled cavity at the heel of the cutter, for allowing the latter to clear itself of shreds and not become clogged. Owing to the form and position of the blade it makes a draw cut across the threads, and not a jam cut like those in which the cutting is done at the angle between the cutter and the guard $c$. The guard $c$ also protects the fingers and cloth from being cut. The seam to be ripped is fastened at one end for convenience in working, and held taut by the left hand while the right hand operates the tool. Both hands may assist in keeping it level with the goods when at work, which is important. The wrench, hook, and niche are useful for various purposes.

Having thus described my invention, I claim as new and desire to secure by Letters Patent—

1. The combination of the cutter $a$, guide $b$, and guard c, so arranged that the line of cutting may be kept on the cutter and out of the eye or apex between the cutter and guard c, all substantially as specified.

2. The eye d, arranged with the cutter and guard c, substantially as specified.

3. The extension-guide b, arranged with the cutter, substantially as specified.

4. The above-described ripping instrument, provided with the wrench f, hook or point g, and the niche h, all substantially as specified.

5. The ripping-tool, constructed and operating as above described, as a new article of manufacture.

The above specification of my invention signed by me this 3d day of May, 1871.

JUSTUS O. WOODS.

Witnesses:
   GEO. W. MABEE,
   WM. H. C. SMITH.